Patented Oct. 25, 1927.

1,646,671

UNITED STATES PATENT OFFICE.

BYRON H. WEBB, OF WASHINGTON, DISTRICT OF COLUMBIA, ASSIGNOR TO THE GOVERNMENT AND THE PEOPLE OF THE UNITED STATES.

PROCESS FOR STERILIZING CREAM.

No Drawing. Application filed April 16, 1927. Serial No. 184,427.

(GRANTED UNDER THE ACT OF MARCH 3, 1883; 22 STAT. L. 625.)

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to me of any royalty thereon.

A method for preparing a sterile cream with a satisfactory flavor and appearance would be of value because it would make it possible to provide cream in tropical countries, on ship board, in camps and under other conditions where fresh cream is not available.

This has never been done successfully because sterilizing the cream gives it an objectionable cooked flavor and the melted fat has a tendeny to become hard. If the fat is held in suspension by homogenization the heat coagulation point of the proteins is lowered so that an objectionable curd is formed when the cream is sterilized.

I have found that these difficulties may be overcome by a proper combination of preheating, homogenization, and temperature of sterilization. Before homogenization, the cream should be heated to about 80° C. This temperature is approximate and wide variations therefrom are permissible in the operation of my process. However, no advantage is gained by heating above 80° C. The lower limit varies with the condition of the cream. With the creams with which I have worked, I find that if a temperature of 75° C. or lower is used a curdling takes place in the sterilization. While still at the preheating temperature the cream is homogenized by present well-known methods at a pressure of 2500 to 3000 pounds. A pressure of 2800 pounds gives satisfactory results in preventing separation of the fat. After homogenization the cream is placed in sealed containers, preferably glass, sealed preferably under a vacuum. No definite temperature of sterilization is essential to the process, but the temperature is important in retaining or preserving the original or natural flavor and color of the cream. It must be a sufficiently high temperature to insure destruction of the bacteria in a short exposure. I obtained the most satisfactory results by sterilizing at 118° C. While this is the optimum temperature, wide variations therefrom are permissible in performing this step of my process and satisfactory results obtained. However, a higher temperature than 118° C. increases the cooked flavor. The time of sterilization will vary with the size of the container and the bacteriological condition of the cream. With a package containing 180 grams, 12 minutes has been satisfactory.

A typical example of the operation of my process is as follows: I secure 30 pounds of cream freshly separated from milk which is less than 24 hours old. If not already testing 20 per cent butterfat, this cream is standardized with skim milk from the same lot of milk, so that the final product contains 20 per cent fat.

This cream I immediately heat in a copper kettle with constant stirring for 15 minutes, when a temperature is reached of exactly 80° C. The cream I now transfer to a homogenizer holding tank and homogenize the product immediately, using a pressure of 2800 pounds. The cream when undergoing homogenization is at a temperature of approximately 75° C. From the homogenizer the cream flows immediately over a brine cooler and is cooled to 15° C.

Next, I fill 180 gram glasses with the cream, using lacquered tin caps with rubber washers as lids. These covers I seal on under a vacuum of 25 inches. The sealed containers I now place in a sterilizer which is half full of water; the reel of the sterilizer revolving through this water during sterilization, thus helping to maintain more uniformity of temperature. I allow 15 minutes to rise to and cool from the sterilization temperature of 118° C. Time of sterilization at 118° C. is 12 minutes. In cooling down I circulate cold water slowly through the sterilizer, keeping the pressure of 10 pounds obtained during sterilization from falling suddenly by adding compressed air. Cooling is continued to room temperature. The cream is now removed and ready for immediate or future consumption.

The resulting cream is a natural rich cream color, resembling plain cream in smoothness of body and viscosity, and with a flavor somewhat cooked but not nearly so pronounced as the cooked flavor of evaporated milk.

I claim:

A process for sterilizing cream, comprising heating cream to approximately 80° C., homogenizing the heated cream at a pressure ranging from 2500 to 3000 pounds, then sealing the cream in air-tight containers and sterilizing the same at a temperature of approximately 118° C.

BYRON H. WEBB.